US011851513B2

(12) United States Patent
Ding et al.

(10) Patent No.: US 11,851,513 B2
(45) Date of Patent: Dec. 26, 2023

(54) POLY(CYCLOHEXADIENE) HOMOPOLYMER BASED COMPOSITIONS AND USES THEREOF

(71) Applicant: Kraton Polymers LLC, Houston, TX (US)

(72) Inventors: Ruidong Ding, Houston, TX (US); Jason Tian, Houston, TX (US); Hannes Hendrik Peter van Erp, Amsterdam (NL); Chad Reiter, Savannah, GA (US)

(73) Assignee: KRATON CORPORATION, Houston, TX (US)

( * ) Notice: Subject to any disclaimer, the term of this patent is extended or adjusted under 35 U.S.C. 154(b) by 142 days.

(21) Appl. No.: 17/301,490

(22) Filed: Apr. 5, 2021

(65) Prior Publication Data

US 2021/0309773 A1    Oct. 7, 2021

Related U.S. Application Data

(60) Provisional application No. 62/704,652, filed on May 20, 2020, provisional application No. 63/005,635, filed on Apr. 6, 2020.

(51) Int. Cl.
| | | |
|---|---|---|
| *C08F 236/04* | (2006.01) | |
| *C08J 5/24* | (2006.01) | |
| *C08F 232/04* | (2006.01) | |
| *C08F 136/04* | (2006.01) | |
| *C08F 132/06* | (2006.01) | |
| *C08L 45/00* | (2006.01) | |

(52) U.S. Cl.
CPC ........ *C08F 236/045* (2013.01); *C08F 132/06* (2013.01); *C08F 136/045* (2013.01); *C08F 232/04* (2013.01); *C08J 5/244* (2021.05); *C08J 5/248* (2021.05); *C08J 2345/00* (2013.01); *C08J 2347/00* (2013.01); *C08J 2421/00* (2013.01); *C08L 45/00* (2013.01)

(58) Field of Classification Search
CPC ... C08L 45/00; C08J 2421/00; C08J 2347/00; C08J 2345/00; C08J 5/244; C08J 5/248; C08F 232/04; C08F 136/045; C08F 132/06; C08F 236/045

USPC ......................................................... 528/396
See application file for complete search history.

(56) References Cited

U.S. PATENT DOCUMENTS

| | | | |
|---|---|---|---|
| 5,312,870 A | 5/1994 | Williams | |
| 2006/0014902 A1* | 1/2006 | Mays ........................ | C08F 8/36 525/331.9 |
| 2010/0036038 A1 | 2/2010 | Rodgers et al. | |

FOREIGN PATENT DOCUMENTS

| | | |
|---|---|---|
| WO | 2006002033 A1 | 1/2006 |
| WO | 2012050658 A1 | 4/2012 |
| WO | 2012050666 A1 | 4/2012 |
| WO | 2016043851 A1 | 3/2016 |

OTHER PUBLICATIONS

Marvel et al., "Preparation and Aromatization of Poly-1,3-cyclohexadiene", Journal of the American Chemical Society, 1959, vol. 81, p. 448-452 (Year: 1959).*
Lefebvre et al., "1,3-Cyclohexadiene Polymers. Part I. Preparation and Aromatization of Poly-1,3-cyclohexadiene", Journal of Polymer Science: Part A, 1964, vo. 2, p. 3277-3295. (Year: 1964).*

* cited by examiner

*Primary Examiner* — David T Karst
(74) *Attorney, Agent, or Firm* — Beth Haslam

(57) ABSTRACT

The disclosure relates to methods for producing poly(cyclohexadiene) homopolymers (PCHD). The PCHD is formed by polymerizing a 1,3-cyclohexadiene monomer in the presence of a catalyst, in a hydrocarbon solvent, and at a temperature of −100° C. to 120° C. The catalyst is selected from the group consisting of a Bronsted acid, a Lewis acid, and combinations thereof. PCHD produced under these conditions has good solubility in non-polar solvents, and a number average molecular weight of 300 to 5,000 Dalton; a weight average molecular weight of 5,000 to 15,000 Delton; and a polydispersity index of 3.0 to 8.0. The PCHD is useful for producing crosslinked materials having good physical properties. The crosslinked materials can be combined with a rubbery polymer to produce compositions valuable for further downstream uses.

16 Claims, No Drawings

POLY(CYCLOHEXADIENE) HOMOPOLYMER BASED COMPOSITIONS AND USES THEREOF

RELATED APPLICATIONS

This application claims benefit to U.S. provisional application Ser. No. 63/005,635 with a filing date of Apr. 6, 2020, and Ser. 62/704,652 with a filing date of May 20, 2020, the entire disclosures are incorporated herein by reference.

FIELD

The disclosure relates to poly(cyclohexadiene) homopolymer based compositions and their uses.

BACKGROUND

Low dielectric materials having a myriad of electrical, thermal, chemical, and mechanical properties have been intensively researched by ceramic and polymer scientists. In many cases, the applications of low dielectric constant materials are dictated by these properties, the choice of low dielectric material may have a tremendous effect on a device's performance and lifetime. The rapid development of the microelectronics industry has also spawned a demand for advanced processes and materials for such applications. The trend towards miniaturization of electronic components has also intensified the need for dielectric materials having optimal electrical and functional performance characteristics, such as for example, a desirable combination of electrical, thermal, chemical, adhesive and mechanical properties.

Poly(cyclohexadiene) homopolymer (PCHD) has been used for electronics applications. The material has been traditionally prepared by anionic polymerization of cyclohexadiene. However, the polymer generally has a narrow molecular weight distribution, i.e., polydispersity index, of less than 1.2, with poor solubility in non-polar solvents, such as aliphatic or aromatic hydrocarbon solvents. Poor solubility limits the use of the polymer in a number of downstream applications.

There is a need for PCHD homopolymer having desirable properties, such as solubility in non-polar solvents, good processability, as well as satisfactory thermal and electronic properties. There is a need for improved methods for making such a homopolymer.

SUMMARY

In one aspect, a poly(1,3-cyclohexadiene) homopolymer formed by cationic polymerization of a 1,3-cyclohexadiene monomer feedstock in the presence of a catalyst is disclosed. The catalyst is selected from the group consisting of a Bronsted acid, a Lewis acid, and combinations thereof. The 1,3-cyclohexadiene monomer feedstock is polymerized in a hydrocarbon solvent, and at a temperature of −100° C. to 120° C. The homopolymer has a number average molecular weight of 300-5,000 Dalton; a weight average molecular weight of 5,000-15,000 Dalton; and a polydispersity index of 3.0 to 8.0.

In another aspect, a method for producing a poly(1,3-cyclohexadiene) homopolymer (PCHD) is disclosed. The method comprises providing a 1,3-cyclohexadiene monomer feedstock (CHD), providing a catalyst suitable for cationic polymerization, and polymerizing the 1,3-cyclohexadiene monomer feedstock in the presence of the catalyst, in a hydrocarbon solvent, and at a temperature of −100° C. to 120° C., to form the homopolymer; and isolating the homopolymer. The catalyst is selected from the group consisting of a Bronsted acid, a Lewis acid, and combinations thereof. The resulting homopolymer has a number average molecular weight of 300-5,000 Dalton; a weight average molecular weight of 5,000-15,000 Dalton; and a polydispersity index of 3.0 to 8.0.

In yet another aspect, a crosslinked polymer formed by reaction of the PCHD with a crosslinking agent is provided. The crosslinked PCHD has a good combination of one or more of a high glass transition temperature (Tg), excellent peel strength to copper, low dissipation factor (Df), low dielectric constant (Dk), and good fire retardancy.

In still another aspect, the crosslinked PCHD can be combined with a rubbery polymer to provide is useful to produce compositions valuable for further downstream uses.

DESCRIPTION

The following terms will be used throughout the specification.

$M_w$, weight average molecular weight, describes the molecular weight average distribution calculated according to:

$$M_w = \frac{\sum_i N_i M_i^2}{\sum_i N_i M_i}$$

where $N_i$ is the number of molecules of molecular weight $M_i$.

$M_n$ is the number average of the molecular weights, calculated according to:

$$M_n = \frac{\sum_i N_i M_i}{\sum_i N_i}$$

where $N_i$ is the number of molecules of molecular weight $M_i$.

$M_z$ is a higher order molecular weight average, or the third power molecular weight, which is calculated according to:

$$M_z = \frac{\sum_i N_i M_i^3}{\sum_i N_i M_i^2}$$

where $N_i$ is the amount of substance of species i and $M_i$ is the molecular weight of species i. $M_z$ $M_w$ and $M_n$ can be determined using GPC-SEC method in ASTM D5296 (2005).

Polydispersity index (PDI) is calculated according to: $PDI = M_w/M_n$

"CHD" refers to 1,3-cyclohexadiene monomer, which can optionally contain up to 10 wt. % of the isomeric 1,4-cyclohexadiene.

Dissipation factor (Df) is defined as the loss rate of electrical energy in a dissipative system.

Dielectric constant (Dk) is defined as the ability of a substance to store electrical energy in an electrical field.

The homopolymer, methods for forming, and uses thereof are further described in as follows.

Poly(cyclohexadiene) homopolymer (PCHD): The PCHD is formed by cationic polymerization of CHD in the presence of a catalyst. In embodiments, the CHD can comprise up to 10 wt. % of 1,4-cyclohexadiene, relative to the overall weight of the CHD. Use of 1,3-cyclohexadiene containing minor amounts of 1,4-cyclohexadiene can be advantageous as no tedious separation of the 1,3- and the 1,4-isomers is necessary.

When CHD undergoes cationic polymerization, the product can contain both 1,2-addition units (Formula I) and 1,4-addition units (Formula II) derived from CHD, where "Pol" stands for polymer chain. 1,4-addition is generally favored over 1,2-addition.

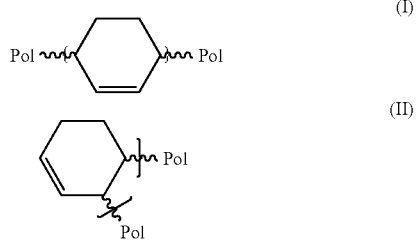

The 1,4- to 1,2-relative ratio can be modified by varying the catalyst and reaction conditions. In embodiments, the PCHD comprises 1,4-addition units and 1,2-addition units of CHD in a relative mole ratio of 90:10 to 10:90, or 50:50, or 30:70 to 70:30, or 40:60 to 60:40, or 20:80 to 80:20.

Preparation of PCHD: PCHD can be prepared by cationic polymerization of CHD in the presence of a catalyst in a suitable solvent. Hydrocarbon solvents are preferred as they are generally inert to the catalyst and cationic intermediates generated during the polymerization. Suitable hydrocarbon solvents include aromatic hydrocarbons, alicyclic or aliphatic hydrocarbons, or combinations thereof. Non-limiting examples of the hydrocarbon solvent include hexane, heptane, octane, isooctane, cyclohexane, varnish maker and painter's naphtha (VM&P naphtha), petroleum ether, toluene, xylene, and mixtures thereof.

A catalyst is used for the polymerization. The catalyst can broadly be a Brønsted acid, a Lewis acid, or combinations thereof. The catalyst can be either a Brønsted acid type or a Lewis acid type. Alternately, the catalyst can also have both Brønsted and Lewis acid type catalytic activity. In embodiments, the catalyst comprises a supported Brønsted acid, an unsupported Brønsted acid, a Lewis acid, a precursor thereof, or combinations thereof. Various non-limiting classes of catalysts can be used, such as organic acids, organic sulfonic acids, organic inorganic acids, acidic zeolites, any Lewis acid based on metals from Groups 3-8, and Groups 12-15 of the Periodic Table of the Elements, and mixtures thereof. Use of Lewis acid catalyst can lead to formation of polymer chains as well as facilitate disproportionation of the polymer chains, leading to improved solubility of the polymer.

Non-limiting examples of Brønsted acids include sulfuric acid, phosphoric acid, hypophosphoric acid, polyphosphoric acid, heteropolyacids, such as phosphotungstic acid and silicotungstic acid, 2,2,3-trichlorobutyric acid, 2,5-dichlorobenzene sulphonic acid, chlorosulphonic acid, methanesulfonic acid, p-toluenesulfonic acid, triflic acid, benzenesulphonic acid, 2,5-dichlorobenzenesulphonic acid, beta-naphthol-3,6,8-tri sulphonic acid, sulphosalicylic acid, and p-toluidine-m-sulphonic acid.

Sulfonated solid acid derivatives can also be used, such as sulfonated styrene-divinylbenzenes, sulfonated silicas, sulfonated fluoropolymers and polystyrene supported sulfonic acids.

Other types of solid inorganic acid catalysts based on silicon, silica, aluminum and/or alumina can also be used. Non-limiting examples are: (i) amorphous silica-alumina having a silica content of 0.1% to 99.9%, and/or a pore size of 0.1 ml/g to 5 ml/g, and/or a surface area (BET) of 100 to 1000 $m^2/g$, calcined at a temperature of 200° C. to 1000° C., (ii) phyllosilicates, such as natural or synthetic clays from the (a) kaolin group, e.g., kaolinite, halloysite, or dickite; (b) smectite group, such as montmorillonite, nontronite, hectorite, saponite, (c) illite/mica group, such as glauconite, muscovite, or paragonite; or (d) chlorite group, such as chamosite, cookeite, or nimite. The solid inorganic acid catalyst can be calcined at a temperature of 200° C. to 1000° C., and treated, washed, and activated with a mineral acid, or used in conjunction with a mineral acid (e.g., sulfuric acid or hydrochloric acid). Alternately, the solid inorganic acid catalyst can be modified in a water-based medium, by treatment or ion exchange, using salts of lithium, sodium, magnesium, or iron.

Other examples of solid inorganic acid catalysts include protonated or cationic forms of modified or pillared clays, such as natural or synthetic microporous aluminosilicates. Examples include materials from the zeolite group, such as USY, L, Mordenite, Ferrierite, ZSM-5, or Beta, calcined at a temperature of 200° C. to 1000° C., and having one or more of a silica content of 0.1% to 99.9%, a pore size of 0.1 ml/g to 5 ml/g, and a surface area (BET) of 100 to 1000 m2/g.

Mesoporous materials in protonated or cationic forms can also be used. Examples include (a) silicoluminophosphates, such as SAPO-11, or SAPO-34; (b) aluminosilicates, such as MCM-41, or MCM-48; or (c) silicates such as SBA-15, or SBA-16, calcined at a temperature of 200° C. to 1000° C., and having one or more of a silica content of 0.1% to 99.9%, a pore size of 0.1 ml/g to 5 ml/g, and a surface area (BET) of 100 to 1000 m2/g.

Solid acid-supported metal systems, having metals such as Ni, Pt, Au, Fe, or Co can also be used. These materials can be obtained by a process comprising, for example, by treating a modified or pillared clay with a mineral acid, such as sulfuric acid or hydrochloric acid.

Any Lewis acid based on metals selected from zinc, boron, aluminum, gallium, indium, titanium, zirconium, tin, vanadium, arsenic, antimony, and bismuth can also be used as a catalyst. Illustrative examples include $AlCl_3$, (alkyl) $AlCl_2$, $(C_2H_5)_2AlCl$ and $(C_2H_5)_3Al_2C_{13}$, $BF_3$, $B(C_6F_5)_3$, $SnCl_4$, $TiCl_4$, $ZnCl_2$, $SnCl_2$, $CuCl_2$, and combinations thereof. Complexes of the foregoing Lewis acids with Lewis bases can also be used. Metallocene halides, such as zirconocene dichloride, titanocene dicloride, or hafnocene dichloride; optionally in combination with an activator, such as methylalumoxane can also be used. Methylalumoxane by itself can also be used as a catalyst.

Non-oxidizing Brønsted acids are preferred so as to prevent or minimize oxidation or oxidative degradation of the cyclic diene and/or the comonomer. Non-limiting examples include perfluoroalkanesulfonic acids, such as trifluoromethanesulfonic; perfluoroalkanoic acids, such as trifluoroacetic acid; and alkanesulfonic acids, such as methanesulfonic acid, ethanesulfonic acid, benzenesulfonic acid, and the like.

In embodiments, the catalyst is a Lewis acid catalyst is selected from the group consisting of $AlCl_3$, $TiCl_4$, $SnCl_4$, B($C_6F_5$)$_3$, $BF_3$ and complexes thereof with Lewis bases; methylalumoxane, metallocene halides and combinations thereof with methylalumoxane; and combinations thereof.

The reaction can be conducted by adding CHD to a mixture of the catalyst and solvent over a period ranging from 5 minutes to several hours, at a temperature of −100° to +120° C., or from 0° to 120° C., or from ambient temperature to 100° C., or from 50° C. to 80° C. The reaction period can vary depending on the reactivity of the monomers. Longer reaction periods may be required at lower reaction temperatures. After all the CHD is added, the resulting reaction mixture can be stirred, if needed, for an additional period ranging from 5 minutes to several hours until all the monomer has essentially disappeared, or alternately, until an analysis of the reaction mixture indicates that the PCHD of sufficient molecular weight has been formed.

Depending on various factors, such as nature of the reaction solvent, temperature, and catalyst, the overall structure of the polymer, the molecular weight, and the relative proportion of 1,2- and 1,4-addition units can vary. The PCHD produced can remain fully soluble in the solvent, partly soluble in the solvent, or mostly insoluble in the solvent. Examples of suitable solvents include aliphatic or alicyclic hydrocarbon solvents, and aromatic hydrocarbon solvents. Specific examples of solvents include toluene, xylene, alkylbenzenes, limonene, turpentine, or combinations thereof. Generally, it is preferred that the polymer remain soluble in the solvent. In embodiments, the polymer has a solubility in the hydrocarbon solvent of 10-80 wt. %, or 25-75 wt. %, or 35-65 wt. %, or 40-50 wt. %, relative to the weight of the solvent.

At the end of the reaction, the polymer can be isolated, if desired, by quenching the reaction mixture with water followed by separating the organic solvent layer and stripping the solvent. Trace organics can be removed from the product under high vacuum.

Crosslinked PCHD: The PCHD product has double bonds resulting from polymerization of the cyclic diene units. These double bonds are reactive to crosslinking agents, e.g., a radical generating compound as curing agent or curing initiator, which allows for preparing crosslinked copolymers. Free radical initiators are especially desirable. They generate radicals at elevated temperature or under the triggering effect of UV or other energy addition.

Examples include sulfur-based agents, peroxide-based agents, tellurium, selenium, polysulfide polymers, metallic oxides, and di-isocyanates. Non-limiting examples of sulfur-based crosslinking agents include $S_2Cl_2$, elemental sulfur, and sulfur donor compounds that liberate sulfur under the crosslinking conditions. Some examples of sulfur donor compounds include tetramethyl thiuram disulfide, 4,4'-dithiodimorpholine, dipentamethylene thiruram tetrasulfide, and thiocarbamyl sulfenamide, dibenzothiazole, N-cyclohexyl-2-benzothiazole, zinc dimethyl dithiocarbamate, thiourea, xanthates, and thiophosphates.

The curing initiator or crosslinking agent, when used, is present in an amount of 0.1-10 wt %, or 0.3 to 7 wt. %, or 1 to 5 wt. %, based on the total weight of the PHCD.

Crosslinking of the polymer chains can be achieved by reaction with the crosslinking agent at temperatures ranging from ambient to 90° C., or up to 300° C., or <=280° C., for up to 1 hour, or up to 30 minutes, or at least 5 minutes, to provide crosslinked polymers. The crosslinking density depends on a number of factors such as the amount of the crosslinking agent, temperature and other physical conditions used. With $S_2Cl_2$, the crosslinking density can vary, for example, in a range of 1-10, corresponding to reaction of 1-10 molecules of $S_2Cl_2$ per 100 polymerized CHD units. The crosslinked PCHD can have good chemical and oxidative stability. Crosslinking also results in raising the Tg of the resulting crosslinked polymer. In embodiments at crosslinking densities up to 10, the Tg increases in an approximately linear manner; with crosslinking densities greater than 10, e.g., up to 20, does not increase in a significant increase in the Tg.

The crosslinked PCHD polymers can also have enhanced fire retardancy, one of the properties that makes them useful for applications as electronic materials. Fire retardance can be measured by measuring the time taken by a sample to completely form char from the time sample ignition is started.

Properties of PCHD: The PCHDs are generally resinous materials. The copolymer formed by cationic polymerization of 1,3-cyclohexadiene monomers through cationic solution polymerization wherein: (i) the monomer is enchain through both 1,2- and 1,4-insertion modes; and (ii) the enchained unit goes through disproportionation reaction at the same time to convert part of the enchained cyclohexenyl into both phenyl and cyclohexane units. The chemical shift of phenyl and cyclohexane groups is distinct from the cyclohexenyl group. The conversion via cationic polymerization can be shown through both proton and/or carbon 13 NMR, e.g., with the presence of phenyl groups above the NMR sensitivity level of >0.1%, or >0.2%, or >0.5%, based on the total weight of the PCHD composition.

In embodiments, polymers prepared using the methods described above generally have a Mn of 300-5,000 Dalton, or 500-3,000 Dalton, or <2000 Dalton, or <1500 Dalton, or >500 Dalton. In embodiments, the polymers have a Mw of 5000-15,000 Dalton, or 7,000-12,000 Dalton, or <10,000 Dalton, or >6,000 Dalton, or >4,000 Dalton. In embodiments, the polymers have a polydispersity index of 3.0-8.0, or 4.0-6.0, or >4.5, or <7.0, or 3.5-7.0.

PCHDs produced using the acidic catalysts, under the conditions described above, are valuable in that they have a good combination of appropriate molecular weight ranges and relatively broad molecular weight distributions (polydispersity index), which in part makes them more soluble in non-polar solvents, thereby enhancing their processability.

In embodiments, the PCHD has a solubility in a hydrocarbon solvent ranging from 25-85 wt. %, or 30-80 wt. %, or 35-60 wt. %, relative to the weight of the solvent. Suitable hydrocarbon solvents include, but are not limited to, hexane, heptane, octane, isooctane, cyclohexane, varnish maker and painter's naphtha (VM&P naphtha), petroleum ether, toluene, xylene, and mixtures thereof. PCHDs having solubility in hydrocarbon solvents are desired as they are convenient for further downstream processing and applications.

In embodiments, the PCHDs have a glass transition temperature (Tg) of 140-220° C., or >150° C., or >160° C., measured using DSC (differential scanning calorimetry) or DMA (dynamic mechanical analyzer). They have a high decomposition onset temperature of 300-400° C., or >330° C., or =>350° C.

After crosslinking, the crosslinked PCHDs exhibit adhesion to metals such as aluminum, copper, etc. In embodiments, the crosslinked copolymers have an adhesion to metal given by a 180° C. peel strength of 0.2-1.5 N/m$^2$, or 0.5-1.25 N/m$^2$, or >0.50 N/m$^2$, or >0.8 N/m$^2$, or <1.8 N/m$^2$. Good adhesion to copper makes the copolymers valuable in electronic applications.

In embodiments, the crosslinked PCHDs have a Tg of 150° C. to 260° C., or 160-240° C., or >160° C., or >165° C., or >180° C., or >200° C.

The crosslinked copolymers in embodiments possess good electrical properties for use in PCB applications, including a low dissipation factor (Df) of <0.01, <0.006, or <0.0055, or in the range of 0.0025-0.0045, or 0.0035-0.0055; and a low dielectric constant (Dk) of <4.5, or <4.0, or <3.5, or in the range of 2-4.0, with Df and Dk being measured according to IPC TM-650 2.5.5.13.

The crosslinked copolymers exhibit good fire retardancy. Fire retardancy of a sample can be assessed by measuring the time taken from ignition, for a test sample to completely form a char, e.g., a fire retardance of less than or equal to 60 seconds, or <50 secs, or <40 secs from ignition time. In embodiments, the resin has a UL 94 rating of V-0, or at least V-1, or at least V-2 rating.

In embodiments, the crosslinked PCHDs, have one or more of a Tg of 140° C.-240° C., a 180° peel strength to copper of 0.35-1.0 N/m, a low dissipation factor (Df) of 0.0025-0.0045, a fire retardance of less than or equal to 20 seconds from ignition time, and a low dielectric constant (Dk) of <4.5, or <4.0, or <3.5, or in the range of 2-4.0. Crosslinked polymers made using sulfur-based crosslinking agents can exhibit even better fire retardancy than pre-crosslinked polymer. Crosslinked PCHDs also exhibit higher adhesion to a metal like copper, as measured by their 180° peel strengths.

Uses of the PCHD in electronic applications: The PCHDs are valuable materials for forming copper clad laminates, electrical appliance housings, electrical cables, electrical connectors, electronic switches, and electronic components, such as printed circuit boards (PCBs), printed wiring boards, and flexible printer circuits (FPC). Prepregs, which are used for making the PCBs, can be made using the crosslinked PCHDs in combination with a rubber component.

The rubber component includes both natural rubber and its various raw and reclaim forms, as well as various synthetic rubbers. In embodiments, the rubber component comprises any of elastomer block copolymers, unsaturated diene elastomer selected from polybutadienes, natural rubber, synthetic polyisoprenes, butadiene copolymers, isoprene copolymers and mixtures thereof.

In embodiments, the rubber is selected from butyl rubber, halogenated butyl rubber, and EPDM (Ethylene Propylene Diene Monomer rubber), and mixtures thereof. In another embodiment, the rubber component is selected from natural rubber (NR), styrene-butadiene rubber (SBR), butadiene rubber, synthetic polyisoprene rubber, epoxylated natural rubber, polybutadiene rubber, e.g., high-cis polybutadiene rubber; nitrile-hydrogenated butadiene rubber HNBR, hydrogenated SBR, ethylene propylene diene monomer rubber, ethylene propylene rubber, maleic acid-modified ethylene propylene rubber, butyl rubber, isobutylene-aromatic vinyl or diene monomer copolymers, brominated-NR, chlorinated-NR, brominated isobutylene p-methylstyrene copolymer, chloroprene rubber, epichlorohydrin homopolymers rubber, epichlorohydrin-ethylene oxide or allyl glycidyl ether copolymer rubbers, epichlorohydrin-ethylene oxide-allyl glycidyl ether terpolymer rubbers, chlorosulfonated polyethylene, chlorinated polyethylene, maleic acid-modified chlorinated polyethylene, methylvinyl silicone rubber, dimethyl silicone rubber, methylphenylvinyl silicone rubber, polysulfide rubber, vinylidene fluoride rubbers, tetrafluoroethylene-propylene rubbers, fluorinated silicone rubbers, fluorinated phosphagen rubbers, styrene elastomers, thermoplastic olefin elastomers, polyester elastomers, urethane elastomers, and polyamide elastomers.

Examples of SBR rubber include an emulsion-polymerized styrene-butadiene rubber (un-modified E-SBR), a solution-polymerized styrene-butadiene rubber (un-modified S-SBR) and modified SBRs obtained by modifying terminals (modified E-SBR and S-SBR). The rubber component can comprise components other than SBR and BR such as natural rubber (NR), isoprene rubber (IR), epoxidized natural rubber (ENR), butyl rubber, acrylonitrile butadiene rubber (NBR), ethylene propylene diene rubber (EPDM), chloroprene rubber (CR) styrene-isoprene-butadiene rubber (SIBR), used alone or in combinations.

The rubber component can comprise a star-branched, branched, and/or functionalized with a coupling agent and/or star-branching or functionalization agent. The branched rubber can be any of branched ("star-branched") butyl rubber, halogenated star-branched butyl rubber, poly(isobutylene-co-p-methylstyrene), brominated butyl rubber, chlorinated butyl rubber, star-branched polyisobutylene rubber, and mixtures thereof.

The crosslinked PCHDs can be laminated onto a metal substrate, e.g., copper, which leads to copper clad laminates (CCL). The laminates such as CCLs, exhibit several useful properties that make them valuable for electronic applications, such as: a low level or no blistering or delamination after subjecting the laminate to a pressure cooker test; a low level or no decomposition during lead-free soldering, chemical resistance against acid, alkaline and oxidative substances, no or low water uptake, good resistance against inner laminate electro-migration, i.e., resistance to CAF (conductive anodic filament) failure, low coefficient of thermal expansion (CTE), high glass transition temperature for stable performance under use conditions, low electrical properties, Df and Dk, stable and high adhesion to metals such as copper under use conditions, low to no impact on polymer resin flow of prepregs for press process, and satisfactory optical qualities, e.g., no agglomerates of the laminate material.

The PCHDs are valuable as dielectric materials as they have a good balance of electrical properties, thermal stability, good thermomechanical and thermal properties for good dimensional stability, and chemical stability. The electrical properties include a low dielectric constant, low dielectric loss and leakage current, Df and Dk, high breakdown voltage, stable and high adhesion to metals such as copper under use conditions, low to no impact on copolymer resin flow of prepregs for press process, and satisfactory optical qualities, e.g., no agglomerates of the laminate material.

When used a prepreg, the composition further comprises a reinforcing material. The prepreg is used in making metal foil clad laminate, with a sheet of the prepreg and a metal foil clad on one side or both sides of the prepreg.

EXAMPLES

The following examples are provided to illustrate the disclosure.

Example 1

A baffled 1 L round bottom reactor flask is equipped with a stirrer blade, nitrogen inlet, pressure outlet and temperature probe. 350 grams of toluene (containing 250 ppm of water, as measured with Karl Fischer moisture analyzer) is charged to the flask, followed by 10 grams aluminum trichloride. The reactor is then heated to 45° C. during a period of half an hour. 250 gram of cyclohexadiene is added slowly to the reactor in 30 min. by addition funnel. The reactor temperature is kept at 45° C. during addition by cooling the flask with a water/ice bath, if necessary. Upon completion of the monomer addition, the reactor is kept at 45° C. for an additional 15 minutes.

A diluted sulfuric acid solution is prepared by adding 4 grams of concentrated sulfuric acid to 150 ml of DI-water. The diluted sulfuric acid solution is charged to the reactor under constant stirring. The reactor temperature is raised to 80° C. The stirring is stopped after 20 min. to allow the phase separation of aqueous and organic layers. The aqueous layer is removed. An additional water wash(es) is performed to ensure full removal of any trace amount of aluminum ions. A sodium carbonate solution (0.8 gram in 150 ml DI-water) is then charged to the reactor. Remove the aqueous phase after extraction under stirring and phase separation. An additional water wash is followed. The resin is then precipitated in 1000 mL cold acetone containing 0.2 g of dissolved BHT by dropwise addition of the organic layer under constant stirring. The precipitated resin is collected on filtration paper by Buchner funnel. It is dried at room temperature to constant weight under vacuum to provide 187.5 g (75% yield) of the desired PCHD polymer. Properties are measured and presented in Table 1, with the solubility measured in toluene at ambient temperature.

TABLE 1

| Polymer Example | Mn | Mw | PDI | Tg (° C.) | Td (° C.) | Solubility (Wt %) |
|---|---|---|---|---|---|---|
| | | | | Polymer Properties | | |
| Example 1 | 1562 | 8460 | 5.4 | 163.9 | 350 | >50 |

Example 2

Fire retardancy of the PCHD polymer is tested on copolymer resins obtained by crosslinking the copolymer with $S_2Cl_2$. The time between the ignition start time and flameout time, corresponding to complete char formation is expected to be less than 20 seconds.

Example 3

80 parts by weight of the PCHD polymer is mixed with 50 parts by weight of methylbenzene as a solvent, thereby completely dissolving into a resin solution, then add 20 parts by weight of triallyl isocyanurate (TAIC) as a crosslinking agent, 3 parts by weight of dicumyl peroxide DCP as an initiator, 15 parts by weight of ethylene bis(tetrabromo phthalimide) as a bromine-containing flame retardant, and 45 parts by weight of silica SO—C2 as a filler into the solution. The mixture is stirred to dissolve into a uniform resin composition, namely a glue solution.

The prepared uniform glue solution is next used to saturate E-fiberglass cloth, and heat and dry the E-fiberglass cloth at 155° C. for 3-10 minutes to completely volatilize the solvent, thereby obtaining prepergs. Overlap pieces of the prepared prepregs, then clad two pieces of 35-m-thick copper foils to the to two surfaces of the overlapped prepregs. Process the assembly of the two copper foils and eight prepregs by heat pressing at a temperature of 200° C. and a pressure of 3.0 MPa for 90 minutes, thereby obtaining a double-sided copper clad laminate. The samples can be measured for peel strength, Tg, Dk, and Df Dissipation factor (Df) and Dk are measured according to according to IPC TM-650 2.5.5.13. The samples are expected to have Dk (10 Ghz) in the range of 3.3 to 3.5, Df (10 Ghz) in the range of 0.0025 to 0.0035, Tg of >160° C., and peel strength of 0.5 to 1.0 N/m².

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

As used herein, the term "comprising" means including elements or steps that are identified following that term, but any such elements or steps are not exhaustive, and an embodiment can include other elements or steps. Although the terms "comprising" and "including" have been used herein to describe various aspects, the terms "consisting essentially of" and "consisting of" can be used in place of "comprising" and "including" to provide for more specific aspects of the disclosure and are also disclosed.

Unless otherwise specified, all technical and scientific terms used herein have the same meanings as commonly understood by one of skill in the art to which the disclosed disclosure belongs, the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A polymer composition formed from a 1,3-cyclohexadiene monomer feedstock in the presence of a catalyst, wherein
    the polymer composition is formed by cationic polymerization,
    the catalyst for the cationic polymerization of 1,3-cyclohexadiene monomer is a Lewis acid catalyst selected from the group consisting of $AlCl_3$, $SnCl_4$, $B(C_6F)_3$, $BF_3$ and complexes thereof with Lewis bases; methylalumoxane, metallocene halides and combinations thereof with methylalumoxane; and combinations thereof, and
    the cationic polymerization is in a hydrocarbon solvent at a temperature of −100° C. to 120° C.;
    wherein the polymer composition has:
    a number average molecular weight of 300-5,000 Dalton,
    a weight average molecular weight of 5000-15,000 Dalton, a polydispersity index of 3.0 to 8.0, and
a solubility in a hydrocarbon solvent of 0.1 to 2 g of the polymer composition per gram of the hydrocarbon solvent; and
wherein the polymer composition contains at least 0.1 wt. % of phenyl groups as measured by proton NMR;
wherein the polymer composition has a glass transition temperature (Tg) of 140-220° C.

2. The polymer composition of claim 1, wherein the 1,3-cyclohexadiene monomer contains up to 10 wt. % of 1,4-cyclohexadiene, relative to the overall weight of the 1,3-cyclohexadiene monomer.

3. The polymer composition of claim 1, wherein the polymer composition comprises polymerized 1,4-addition units and polymerized 1,2-addition units of the 1,3-cyclohexadiene monomer in a relative ratio of 90:10 to 20:80.

4. The polymer composition of claim 1, wherein the hydrocarbon solvent is selected from the group of aromatic hydrocarbons, alicyclic or aliphatic hydrocarbons, and combinations thereof.

5. The polymer composition of claim 1, wherein the polymer composition has a solubility in the hydrocarbon solvent ranging from 10 wt. % to about 80 wt. %, relative to the weight of the hydrocarbon solvent.

6. A crosslinked polymer formed by reaction of the polymer composition of claim 1 with a crosslinking agent selected from the group of sulfur-based agents, peroxide-based agents, tellurium, selenium, polysulfide polymers, metallic oxides, di-isocyanates, and combinations thereof.

7. The crosslinked polymer of claim 6, wherein the crosslinked polymer has one or more of
a Tg of 140° C. to 260° C.,
a 180° peel strength to copper of 0.35 to 1.0 N/m,
a dissipation factor of 0.0025 to 0.0045, measured according to IPC TM-650 2.5.5.13,
a dielectric constant Dk of 2.0 to 3.0, measured according to IPC TM-650 2.5.5.13, and
a fire retardancy, corresponding to the time taken for complete char formation, measured from sample ignition time, of less than or equal to 20 seconds.

8. The crosslinked polymer of claim 7, wherein the crosslinking agent is $S_2Cl_2$, and wherein the crosslinked polymer has a crosslinking density corresponding to reaction of 1-10 molecules of $S_2Cl_2$ per 100 polymerized 1,3-cyclohexadiene units.

9. A prepreg composition comprising the crosslinked polymer of claim 7, a reinforcing material, and a rubber polymer.

10. The prepreg composition of claim 9, wherein the rubber polymer rubber comprises an unsaturated diene elastomer selected from polybutadienes, natural rubber, synthetic polyisoprenes, butadiene copolymers, isoprene copolymers, and mixtures thereof.

11. A copper clad laminate, electrical appliance housing, electrical cables, electrical connectors, electronic switches, or printed wiring boards comprising the crosslinked polymer of claim 7.

12. A method for producing a polymer composition, the method consists essentially of:
providing a 1,3-cyclohexadiene monomer feedstock;
providing a catalyst suitable for cationic polymerization, wherein the catalyst consists of is a Lewis acid catalyst selected from the group consisting of $AlCl_3$, $SnCl_4$, $B(C_6F_2)_3$, $BF_3$ and complexes thereof with Lewis bases; methylalumoxane, metallocene halides and combinations thereof with methylalumoxane; and combinations thereof;
polymerizing the 1,3-cyclohexadiene monomer feedstock in a cationic polymerization reaction in the presence of the Lewis acid catalyst, in a hydrocarbon solvent, and at a temperature of −100° C. to 120° C., to form the polymer composition; and
isolating the polymer composition;
wherein the polymer composition contains at least 0.1 wt. % of phenyl groups as measured by proton NMR; and
wherein the polymer composition has:
a number average molecular weight of 300-5,000 Dalton,
a weight average molecular weight of 5000-15,000 Dalton, and
a polydispersity index of 3.0 to 8.0; and
a glass transition temperature (Tg) of 140-220° C.

13. The method of claim 12, wherein the polymer composition contains at least 0.5 wt. % of phenyl groups as measured by proton NMR.

14. The method of claim 12, wherein the polymer composition comprises polymerized 1,4-addition units and polymerized 1,2-addition units in molar ratio from 90:10 to 10:80.

15. The method of claim 12, wherein the cationically polymerizing is at a reaction temperature of 100° C. 0° C. to 120° C.

16. The method of claim 12, further comprising crosslinking the polymer composition with a crosslinking agent to provide a crosslinked copolymer, wherein the crosslinking agent is selected from the group of sulfur-based agents, peroxide-based agents, tellurium, selenium, polysulfide polymers, metallic oxides, di-isocyanates, and combinations thereof.

* * * * *